UNITED STATES PATENT OFFICE.

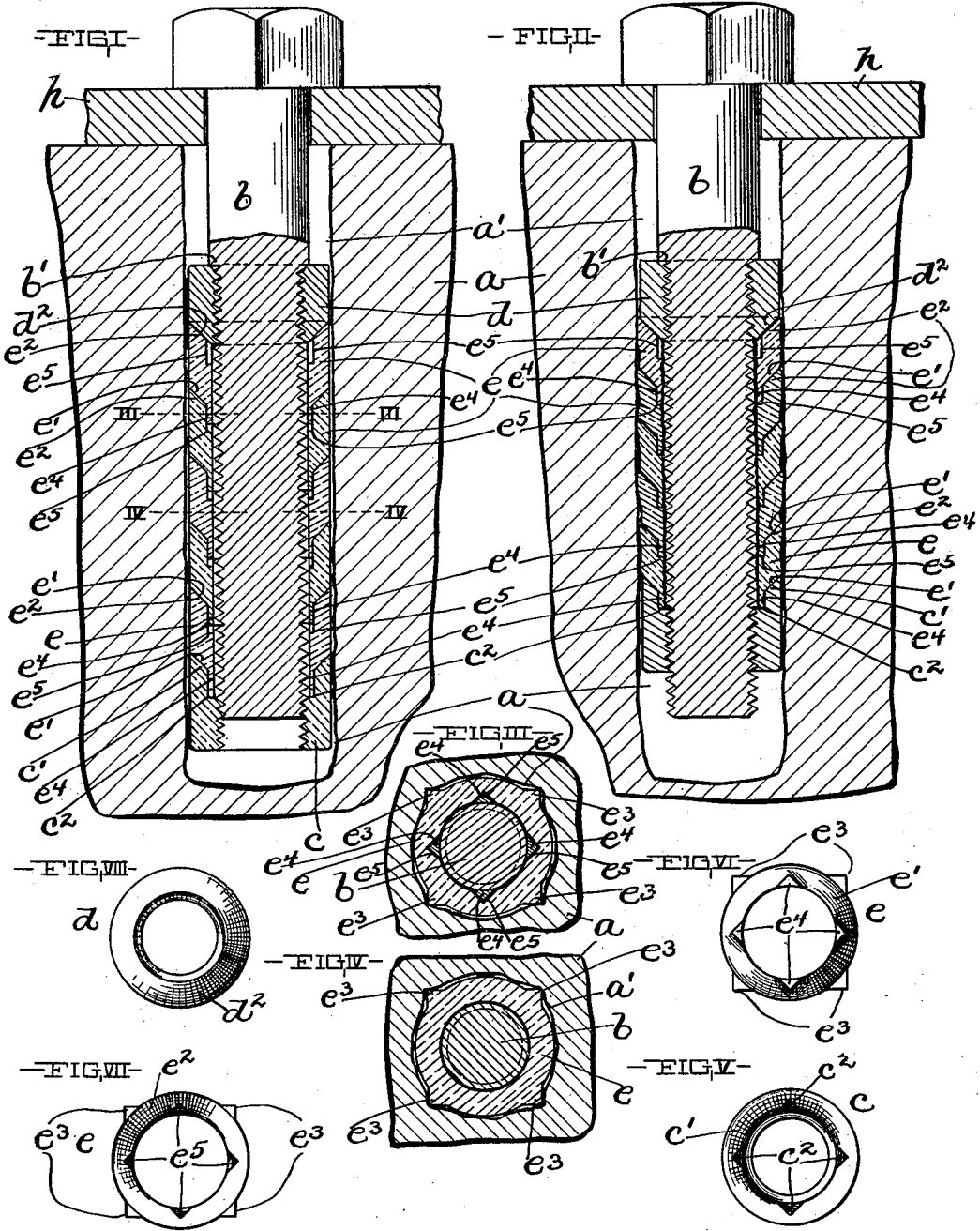

JOHN C. SUMMERER, OF CLEVELAND, OHIO.

EXPANSION-BOLT.

SPECIFICATION forming part of Letters Patent No. 665,705, dated January 8, 1901.

Application filed August 6, 1900. Serial No. 25,996. (No model.)

*To all whom it may concern:*

Be it known that I, JOHN C. SUMMERER, a resident of Cleveland, in the county of Cuyahoga and State of Ohio, have invented certain new and useful Improvements in Expansion-Bolts; and I do hereby declare the following to be a full, clear, and exact description of the invention, such as will enable others skilled in the art to which it pertains to make and use the same.

My invention relates to improvements in expansion-bolts or fastening devices for attaching bed-plates, beams, and other objects to a foundation or other support or for lifting objects, such, for instance, as stones, blocks of cement, &c.

The invention consists, primarily, in a fastening device that comprises an ordinary bolt having a screw-threaded shank, an endwise-shiftable nut mounted upon and engaging the free end of the shank of the bolt, a relatively stationary abutment-forming non-expansible collar mounted upon the bolt's shank between the said nut and the head of the bolt, and a plurality of expansible collars mounted upon the bolt between the non-expansible collar and the aforesaid nut and arranged to be expanded laterally upon shifting the nut toward the relatively stationary non-expansible collar by turning the bolt in the required direction.

The object of this invention is to provide a fastening device of the character indicated that is simple and durable in construction, that can be readily applied, and that has great efficiency.

In the accompanying drawings, Figure I is a sectional view of a foundation, stone, or other support or body provided with a hole or aperture engaged by a fastening device embodying my invention, and the fastening device is shown in central longitudinal section in this figure. Fig. II is a sectional view corresponding with Fig. I, except that the expansible collars of the fastening device are shown compressed and expanded. Fig. III is a transverse vertical section on line III III, Fig. I, looking in the direction of the arrow. Fig. IV is a transverse section on line IV IV, Fig. I, looking in the direction of the arrow. Fig. V is an elevation of the collar-expanding end of the shiftable nut. Figs. VI and VII show opposite ends, respectively, of one of the compressible and expansible collars. Fig. VIII shows the collar-expanding end of the stationary abutment-forming collar.

Referring to the drawings, $a$ designates a foundation, stone, block of cement, or other body that is to act as a support or that is to be lifted. The body $a$ has an aperture or hole $a'$, which is open at the upper or outer side of the body. The hole $a'$ is made large enough to accommodate the reception of my improved expansion-bolt or fastening device that is employed in securing an object to the body $a$ or is instrumental in lifting the body upon attaching a hoisting-cable to the fastening device.

The fastening device comprises an ordinary bolt $b$ and an endwise-shiftable nut or internally-screw-threaded sleeve $c$, mounted upon and engaging the free end of the correspondingly-threaded shank of the bolt. A relatively stationary abutment-forming non-expansible collar $d$ is mounted upon the inner end of the threaded portion of the bolt's shank and preferably abuts against an annular shoulder $b'$, formed upon the bolt's shank at the inner end of the threaded portion of the shank. Several laterally-expansible and preferably compressible collars $e$ are loosely mounted upon the bolt's shank between the non-expansible collar $d$ and the nut $c$. The collars $d$ and $e$ are cylindrical externally.
Each collar $e$ is provided externally with several ribs $e^3$, preferably four in number, that are arranged at equal intervals circumferentially of the collar. The hole $a'$, that is made in the body $a$ for the reception of the fastening device, is just large enough to accommodate the introduction of the said device into the said hole—that is, the fastening device must be driven into the hole $a'$, so as to cause the external ribs $e^3$ of the collars $e$ to become partially embedded in the surrounding wall of the said hole. The engagement of the ribs $e^3$ of the collar $e$ with the surrounding wall of the hole $a'$ prevents displacement of the said collars circumferentially of the bolt's shank.
The collar $d$ prevents endwise displacement of the collars $e$ in the direction of the head of the bolt during the introduction of the fastening device into the hole $a'$. Each expansible collar $e$ is conical or tapering at one end, as at $e'$, and has its other end provided with an outwardly-flaring annular recess $e^2$, which has the dimensions required to render it capable of snugly receiving the conical or tapering end of an adjacent expansible collar $e$—that is, the collars $e$ are uniform, and consequently interchangeable, and their arrangement is such that each collar $e$, except the collar $e$ that is next adjacent to the non-expansible collar $d$, has its recess $e^2$ engaged by the conical or tapering end $e'$ of an adjacent collar. The non-expansible collar $d$ has its collar-expanding end conical or tapering, as at $d^2$, and engaging the recess $e^2$ in the next adjacent expansible collar $e$. The nut $c$ has its inner end provided with an outwardly-flaring annular recess $c'$, engaged by the conical or tapering end $e'$ of the next adjacent expansible collar $e$.

Means for preventing turning of the nut within the hole $a'$ is provided and consists, preferably, of several grooves $c^2$, formed within the said nut at the inner and diametrically smaller end of the nut's recess $c'$ at suitable intervals circumferentially of the nut and engaged by tongues $e^4$, formed at corresponding intervals circumferentially of and upon the outer and diametrically smaller extremity of the conical or tapering end $e'$ of the next adjacent expansible collar $e$. Preferably each collar $e$ is provided at the inner and diametrically smaller end of its recess $e^2$ with grooves $e^5$, arranged at suitable intervals circumferentially of the bolt, and the grooves $e^5$ of each collar $e$, except the grooves $e^5$ of the collar $e$ that is next adjacent to the non-expansible collar $d$, are engaged by tongues $e^4$, formed upon the adjacent outer and diametrically smaller extremity of the tapering or conical end portion of an adjacent collar $e$. The tongue-and-groove connection between adjacent collars $e$ prevents displacement of the said collars circumferentially of the bolt independently of each other and is consequently instrumental in the maintenance of the said collars $e$ in alinement. The tongue-and-groove connection between the nut $c$ and the next adjacent expansible collar $e$, as already indicated, prevents the turning of the said nut independently of the collars $e$, so that when the bolt is turned in the direction required to actuate it inwardly the said nut does not turn upon the bolt's shank, but is shifted endwise of the bolt toward the relatively stationary collar $d$. The series of expansible collars $e$ is confined, therefore, between two compressing and expanding members, and one of these collar-expanding members is the said endwise-shiftable nut and the other of the said collar-expanding members is the relatively stationary non-expansible collar $d$, and obviously the compression and lateral expansion of the collars $e$ take place as soon as the said nut begins to shift toward the abutment-forming collar $d$.

The tapering or conical end of the non-expansible collar $d$ and the tapering or conical end of each expansible collar that is connected with an adjacent expansible collar $e$ by a tongue-and-groove connection act upon the surrounding wall of the engaging flaring recesses $e^2$ of the said collars $e$ and during the shifting of the nut $c$ toward the abutment $d$ result in the compression and displacement of the material composing the said shells $e$ laterally and outwardly in all directions, so as to cause the said shells to tightly engage and become partially embedded in the surrounding wall of the hole $a'$ of the object or body to which the fastening device is thereby fixed.

The provision of the series of comparatively short expansible collars $e$ is particularly advantageous in that they cause the fastening device to be positively fixed to the surrounding wall $a'$ at many points longitudinally of the bolt and render the device particularly valuable in attaching a hoisting-cable to a stone, block of cement, or similar object.

The expansible shells $e$ are composed generally of lead or material that is similarly compressible as well as expansible; but in some instances soft iron, brass, or other malleable metal, because of its greater hardness, is preferable.

A plate $h$ is shown secured to the body $a$ in Figs. I and II.

What I claim is—

1. An expansion-bolt or fastening device of the character indicated, comprising a bolt; an endwise-shiftable nut or internally-screw-threaded sleeve $c$ mounted upon and engaging the threaded end of the correspondingly-threaded shank of the bolt; a relatively stationary abutment-forming collar mounted upon the bolt's shank between the aforesaid nut and the head or outer end of the bolt; means for preventing turning of the nut, and a series of comparatively short expansible collars upon the bolt between the aforesaid abutment-forming collar and the endwise-shiftable nut, and the adjacent ends of the adjacent expansible collars having such configuration as to assist or facilitate the lateral expansion of the said expansible collars upon turning the bolt in the direction required to shift the nut toward the aforesaid abutment-forming collar.

2. An expansion-bolt or fastening device of the character indicated, comprising a bolt $b$; an endwise-shiftable nut or internally-screw-threaded sleeve $c$ mounted upon and engaging the threaded end of the correspondingly-threaded shank of the bolt; a relatively stationary abutment-forming non-expansible collar mounted upon the bolt's shank between the aforesaid nut and the head or outer end of the bolt; means for preventing turning of the nut, and a series of comparatively short expansible collars upon the bolt between the non-expansible collar and the aforesaid nut, and the adjacent ends of the adjacent expansible collars having such configuration as to assist or facilitate the lateral expansion of the said expansible collars upon turning the bolt in the direction required to shift the nut toward the non-expansible collar.

3. An expansion-bolt or fastening device of the character indicated, comprising a bolt; an endwise-shiftable nut or internally-screw-threaded sleeve $c$ mounted upon and engaging the threaded end of the correspondingly-threaded shank of the bolt; a relatively stationary abutment-forming collar mounted upon the bolt's shank between the aforesaid nut and the head or outer end of the bolt; means for preventing turning of the nut; a series of comparatively short expansible collars upon the bolt between the aforesaid abutment-forming collar and the endwise-shiftable nut, and tongue-and-groove joints between contiguous or adjacent ends of adjacent or contiguous expansible collars.

4. An expansion-bolt or fastening device of the character indicated, comprising a bolt; an endwise-shiftable nut or internally-screw-threaded sleeve $c$ mounted upon and engaging the threaded end of the correspondingly-threaded shank of the bolt, and having the flaring recess $c'$ and the grooves $c^2$; a relatively stationary abutment-forming non-expansible collar mounted upon the bolt's shank between the aforesaid nut and the head or outer end of the bolt, and having the conical end $d^2$; and the series of comparatively short expansible collars $e$ having, respectively, a conical end $e'$, a flaring recess $e^2$, external ribs $e^3$, tongues $e^4$ and grooves $e^5$, all arranged and operating substantially as shown, for the purpose specified.

Signed by me at Cleveland, Ohio, this 16th day of July, 1900.

JOHN C. SUMMERER.

Witnesses:
C. H. DORER,
A. H. PARRATT.